United States Patent [19]

Thompson

[11] 4,455,184
[45] Jun. 19, 1984

[54] PRODUCTION OF LAMINATE POLYESTER AND PAPERBOARD

[75] Inventor: Kenneth P. Thompson, Canton, N.C.

[73] Assignee: Champion International Corporation, Stamford, Conn.

[21] Appl. No.: 467,930

[22] Filed: Feb. 18, 1983

Related U.S. Application Data

[63] Continuation of Ser. No. 185,777, Sep. 10, 1980, abandoned.

[51] Int. Cl.³ .............................................. B32B 31/30
[52] U.S. Cl. ............................ 156/244.11; 156/244.23
[58] Field of Search ...................... 156/244.11, 244.22, 156/244.23; 428/480, 481, 483, 511, 513

[56] References Cited

U.S. PATENT DOCUMENTS

| | | | |
|---|---|---|---|
| 3,017,302 | 1/1962 | Hultrans | 156/244.11 |
| 3,247,290 | 4/1966 | Werkman et al. | 156/244.11 |
| 3,402,086 | 9/1968 | Smith et al. | 156/244.11 |
| 3,629,037 | 12/1971 | Masuda et al. | 156/244.11 |
| 3,791,915 | 2/1974 | Goehring et al. | 156/244.11 |
| 3,836,620 | 9/1974 | Bhuta et al. | 156/244.11 |
| 3,904,104 | 9/1975 | Kane | 229/3.5 |
| 3,939,025 | 2/1976 | Kane | 156/244.23 |
| 3,972,467 | 8/1976 | Whillock | 428/511 |
| 4,046,837 | 9/1977 | Carroll | 428/481 |
| 4,147,836 | 4/1979 | Middleton et al. | 428/481 |

*Primary Examiner*—Caleb Weston
*Attorney, Agent, or Firm*—Evelyn M. Sommer

[57] ABSTRACT

This invention provides a process for the lamination of a polyester, particularly polyethylene terephthalate, to a paperboard substrate which comprises coextruding a polyester layer and a polymeric adhesive layer onto a paperboard substrate. By use of this process, well adhered coatings of polyester can be obtained where the polyester is used in amounts as low as 10 pounds of polyester per ream. The adhesive layer can be pigmented thereby providing visual enhancement of the laminate product. Moreover, the paperboard can be treated with sizing agents or the like without serious adverse effects on the adherence of the polyester layer. Laminates produced in accordance with this invention are less costly than those of the prior art as they include less polyester per unit of surface.

7 Claims, 2 Drawing Figures

PRODUCTION OF LAMINATE POLYESTER AND PAPERBOARD

This is a continuation of application Ser. No. 185,777 filed Sept. 10, 1980, now abandoned.

BACKGROUND OF THE INVENTION

1. Field of the Invention

This invention is directed to laminates comprising polyester and paperboard and to a process for forming such laminates. More specifically, this invention is directed to polyester/paperboard laminates which include an intermediate adhesive layer and to a method of forming such laminates by coextruding a layer of polyester and a layer of an adhesive onto a paperboard substrate.

2. Description of the Prior Art

The use of polyester/paperboard laminates in the preparation of ovenable containers is increasing. However, due to the crystalline nature and non-adherent characteristics of the polyesters, particularly polyethylene terephthalate, fabrication of such laminates has been accomplished only with difficulty, requiring special treatment of the paperboard substrate.

A process for preparing a polyester/paperboard laminate is disclosed in U.S. Pat. No. 3,939,025 to Kane, wherein the paperboard substrate is heated to a temperature of at least 285° F. and is thereafter extrusion coated with polyester material. Another process for adhering polyester to paperboard involves pretreating a paperboard substrate by exposing it to electrical discharge and thereafter extrusion coating the pretreated substrate.

Even when such paperboard pretreatment processes are used, however, it has often been necessary to extrude polyethylene terephthalate at a 26 to 28 pound per ream coat weight in order to obtain adequate adherence of the polyester to the paperboard. However, general performance requirements for the laminate as used in, for example, ovenable containers, do not require such a heavy weight coating. Accordingly, the excess polyester which must be used places an economic burden on the system.

3. Summary of the Invention

This invention provides a process for the preparation of a laminate comprising a layer of a polyester, particularly polyethylene terephthalate, and a paperboard layer, which process comprises coextruding a polyester layer and a polymeric adhesive layer which adheres to both paperboard and polyester, onto a paperboard substrate. By use of this process, polyester/paperboard laminates can be prepared using as little as 10 pounds of polyester per ream without delamination. The adhesive layer can be pigmented thereby providing visual enhancement of the laminate product. Moreover, the paperboard can be treated with sizing agents or the like without serious adverse effects on the adherence of the polyester layer. The polyester/paperboard laminates produced in accordance with this invention are less costly than those of the prior art since they require a smaller coat weight of polyester.

BRIEF DESCRIPTION OF THE DRAWINGS

In the drawings which form part of the original disclosure of this invention.

DETAILED DESCRIPTION OF THE PREFERRED EMBODIMENTS

Figure 1:
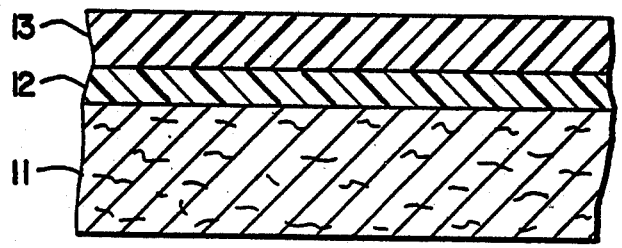
FIG. 1 is a diagramatic cross section of a laminate of the invention.

Referring to FIG. 1, a laminate is illustrated which comprises paperboard layer 11, an extrudable polymeric adhesive layer 12 and a polyester layer 13.

Any conventional paperboard such as is well known in the container art can be used herein. The laminate produced according to this invention can advantageously be used to provide ovenable containers and accordingly a conventional non-browning paperboard can be used where it is desired that the laminate be compatible with high oven temperatures and still maintain a non-browned appearance.

The paperboard can be coated with sizes, wet strength resins or combinations thereof, as desired, without serious adverse effects as to adherence of the polyester layer. Where it is desired to use the two-dimensional laminate to form a three dimensional object, such as a food tray, through the use of forming die, the paperboard is advantageously treated with a sizing agent comprising an alkyl ketene dimer (commercially available as Aquapel) which not only provides wet strength and edge wick resistance to the paperboard but additionally renders the paperboard more amenable to die molding through a mechanism not completely understood.

Similarly any conventional polyester resin which is compatible with extrusion equipment can be used in producing the laminate of this invention. Such compatibility with extrusion equipment normally requires that the resin be capable of withstanding temperatures of up to about 600° F. A preferred polyester resin for use in this invention is polyethylene terephthalate, hereinafter referred to as PET. In the further discussion of polyester materials such will be referred to as PET; however, it will be understood that other polyester materials are suitable.

Polymeric layer 12 is a polymeric adhesive material which is extrudable and which adheres to both paperboard and PET. Such materials include the ethylene/vinyl acetate copolymers; acrylic acid copolymers; ethylene methylacrylate copolymers (EMA); physical blends of polyethylene with about 20% by weight PET; a physical blend of EMA and PET, and the like, with a 2 melt index EMA being preferred. If desired, the polymeric adhesive materials can be compounded with pigments or dyes thereby providing enhancement of the appearance of the final laminate.

Thickness and coating weight of the PET layer 13 and of the polymeric adhesive layer 12 are not critical. However, by providing the laminate in accordance with this invention, PET layer 13 may be made thinner and lighter than the PET layers of laminates of the prior art and for the purpose of economy it will be desirabe to minimize the thickness of PET layer 13 to a thickness of as small as about ½ mil. Advantageously, the PET layer will have a coating weight in the range of between about 28 and about 5 lbs/ream, preferably between about 12 and about 7 lbs/ream. The coating weight of the polymeric adhesive layer will desirably be less than that of the PET layer and can be in the range of between about 12 and about 2 lbs/ream, preferably in the range of about 7 and about 3 lbs/ream.

As previously indicated the laminate of the invention is advantageously used in providing food containers. Although many of the conventional polymeric adhesive materials have not been approved for contacting foods, the adhesive materials used herein are "encapsulated" between a paperboard layer and a PET layer and therefore make no direct contact with food. Accordingly, adhesive materials can be used which would not normally be contemplated for use in food containers.

Figure 2:
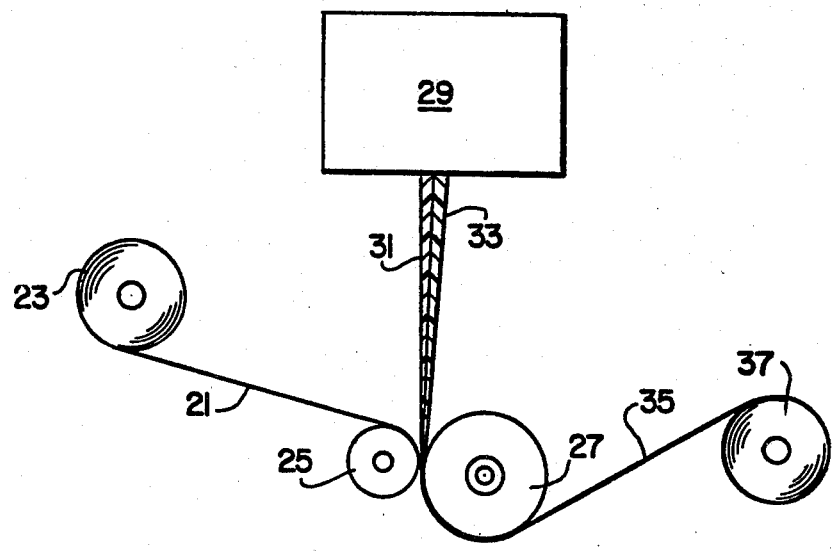
FIG. 2 schematically illustrates the production of a laminate in accordance with the process of the invention.

FIG. 2 diagramatically illustrates the coextrusion process for producing the laminate of this invention. Paperboard 21 is fed from feed roll 23 to pressure roll 25 and chill roll 27. Coextrusion apparatus 29 which comprises an internal combining die provides the molten layer consisting of polymeric adhesive layer 31 and PET layer 33.

Suitable coextrusion apparatus are well known to those skilled in the area. For example, an advantageous arrangement for providing the two molten layers 31 and 33 involves the use of a primary extruder and a satellite extruder with the molten plastic issuing from the two extruders being fed to a combining adaptor which advantageously comprises a dual manifold, single slot die. This type of die can utilize the supportive nature of the adhesive layer to help carry the less viscous PET layer. Such apparatus is disclosed in e.g., *Modern Plastics Encyclopedia*, 1978-1979 Edition, pp. 245-246, which pages are hereby incorporated by reference. Other conventional coextrusion apparatus is known to those skilled in the art and is suitable for use herein.

The molten adhesive polymeric layer 31 and PET layer 33 are received on the paperboard in the vicinity of pressure roll 25 and the three layers are formed into a single laminate by means of pressure roll 25 and chill roll 27. The thus formed laminate 35 is withdrawn for storage by take-up roll 37.

The resultant laminate can be formed into containers in a conventional manner, as by forming blanks and then shaping the blanks into a carton, tray or the like through the use of, e.g., a forming die. As PET heat seals at a temperature of about 260° F. (amorphous PET) or 470° F. (crystalline PET), the PET itself, can be used to adhere sides of the carton, tray, etc. together when the tray is formed at a temperature of at or above such temperatures.

The following examples are provided in order to further illustrate the invention.

EXAMPLE 1

A primary extruder, a satellite extruder and a combining adaptor are used to provide a two layer coating film. The primary extruder contains PET (commercially available as "Cleartuf 7202" from Goodyear Chemical); is equipped with a 4½ inch extruder head; and is operated at a temperature of 630° F. The satellite extruder contains EMA (commercially available as "Poly-Eth 2205" from Gulf Oil Chemical Co.) and is equipped with a 2½ inch extruder head.

The combining adaptor-die combination used has a die length of 36 inches. Two polymer layers issue from the die, each having a 36 inch width prior to neck-in. The outer layer is PET and the inner layer is EMA.

A bleached Kraft paperboard pretreated by flame priming, which has a weight of 160 lbs/ream and a thickness of 0.015 inch is fed past the extruder at a rate of 330 feet per minute. The primary extruder is operated at a rate to provide PET at a coating weight of 10 pounds per ream and the satellite extruder is operated at a rate to provide EMA at a coating weight of 3 pounds per ream.

The resultant laminate comprises paperboard bearing, in order, a 0.0002 inch thickness layer of EMA and a 0.0005 inch thickness layer of PET.

EXAMPLE 2

The extrusion apparatus of Example 1 is used with PET issuing from the primary extruder at a rate to provide a coating weight of 14 pounds per ream; and pigmented EMA (commercially available as "Poly-Eth 2205" and 10% $TiO_2$ master-batch) issuing from the satellite extruder at a rate to provide a coating weight of 7 pounds per ream. Paperboard having a thickness of 0.015 inch and a weight of 160 lbs/ream is used as the substrate.

The resultant laminate comprises paperboard bearing in order a 0.00047 inch thickness layer of pigmented EMA and a 0.00068 thickness layer of PET.

Although the invention has been described in considerable detail with particular reference to certain preferred embodiments thereof, variations and modifications can be effected within the spirit and scope of the invention as described hereinbefore, and as defined in the appended claims.

What is claimed is:

1. A process for forming a laminate of paperboard and polyester for use in the preparation of ovenable containers capable of being used in a hot environment which comprises coextruding:
   (A) a first molten layer comprising a polyethylene terephthalate resin; and
   (B) a second molten layer comprising an extrudable polymeric adhesive comprising an ethylene methylacrylate copolymer which adheres both to the polyethylene terephthalate resin and to paperboard;
   onto a paperboard substrate in a single step to form a polyethylene terephthalate resin/paperboard laminate, said first layer comprising the outer layer.

2. A process for forming a laminate of paperboard and polyester for use in the preparation of ovenable containers capable of being used in a hot environment which comprises coextruding:
   (A) a first molten layer comprising a polyethylene terephthalate resin; and
   (B) a second molten layer comprising an extrudable polymeric adhesive selected from the group consisting of ethylene/vinyl acetate copolymers; acrylic acid copolymers; ethylene methylacrylate copolymers; physical blends of polyethylene with about 20% by weight polyethylene terephthalate; and a physical blend of ethylene methylacrylate and polyethylene terephthalate which adheres to both the polyethylene terephthalate resin and paperboard;
   onto a paperboard substrate in a single step to form a polyethylene terephthalate resin/paperboard laminate, said first layer comprising the outer layer.

3. The process of claim 1, wherein said polyethylene, terephthalate layer has a coating weight of between about 12 and about 7 pounds per ream.

4. The process of claim 3, wherein said polymeric adhesive has a coating weight of between about 12 and about 2 pounds per ream.

5. The process of claim 4, wherein said polymeric adhesive is an ethylene-methylacrylate copolymer.

6. The process of claim 5, wherein said paperboard has been pretreated with a material comprising a sizing agent or a wet strength agent.

7. The process of claim 6, wherein said sizing agent comprises an alkyl ketene dimer.

* * * * *